3,763,093
ALKYLHYDROXYPHENYLCARBOALKOXY-SUB-
STITUTED NITROGEN HETEROCYCLES AS
STABILIZERS AGAINST OXIDATIVE, THER-
MAL AND PHOTOCHEMICAL DEGRADATION
OF ORGANIC MATERIALS
George Kletecka, Lakewood, and Peter D. Smith, Cleveland, Ohio, assignors to The B. F. Goodrich Company
No Drawing. Original application Apr. 27, 1970, Ser. No. 32,435, now Patent No. 3,531,483. Divided and this application Feb. 10, 1972, Ser. No. 225,341
Int. Cl. C08f 45/60
U.S. Cl. 260—45.8 N                                    17 Claims

ABSTRACT OF THE DISCLOSURE

Compounds containing one or more alkylhydroxyphenyl groups bonded through carboalkoxy linkages to a nitrogen atom of a heterocyclic nucleus containing an imidodicarbonyl $$\left(\begin{array}{c} O\ H\ O \\ \|\ |\ \| \\ -C-N-C- \end{array}\right)$$

group or an imidodithiocarbonyl $$\left(\begin{array}{c} S\ H\ S \\ \|\ |\ \| \\ -C-N-C- \end{array}\right)$$

group have been prepared and are extremely effective stabilizers against the deleterious effects of oxygen, heat and light for organic materials. The stability of polymeric compositions such as α-olefin polymers and copolymers, acetal polymers, polyamides, polyesters and polyurethanes is markedly increased by the addition of small amounts of the present compounds thereto.

---

This is a division of application Ser. No. 32,435 filed Apr. 27, 1970, now U.S. Pat. 3,531,483.

BACKGROUND OF THE INVENTION

Esters of nitrogen heterocycles containing the imidodicarbonyl or imidodithiocarbonyl molecular groupings are known, however, the ester substituents have typically been limited to the more common aliphatic hydrocarbon radicals containing up to about 8 carbon atoms. Aryl-substituted isocyanurates have been prepared but have generally been limited to functionally unsubstituted isocyanurates, that is where the aromatic nuclei contain no substitution. In a copending U.S. patent application Ser. No. 770,863 now U.S. Pat. 3,531,483, aryl isocyanurates wherein the aryl substituent is functionally substituted with a hydroxyl group were prepared. The hydroxyaryl group was bonded to the isocyanurate nucleus by a methylene (—CH₂—) linkage. It would be desirable to have isocyanurates and structurally related heterocyclic compounds substituted with one or more hydroxyaryl groups wherein the hydroxyaryl groups are bonded to the isocyanurate or other heterocyclic nucleus through an ester-type linkage.

SUMMARY OF THE INVENTION

We have now prepared compounds containing one or more alkylhydroxyphenyl groups bonded through carboalkoxy linkages to a nitrogen atom of a heterocyclic nucleus containing imidodicarbonyl or imidodithiocarbonyl molecular groupings in the ring. Preferably the alkylhydroxyphenyl group will contain alkyl substitution and more preferably tertiary alkyl groups containing from 4 to 8 carbon atoms immediately adjacent to the hydroxy group on the benzene ring. The total number of carbon atoms making up the carboalkoxy linkage will be between about 2 and 20. While a wide variety of heterocyclic compounds may serve as the nucleus for the compounds of the present invention, so long as they contain one or more imidodicarbonyl or imidodithiocarbonyl molecular groupings within the ring, excellent results are obtained when isocyanuric acid serves as the nucleus and is substituted with one, two or three alkylhydroxyphenyl groups.

The present alkylhydroxyphenylcarboalkoxy-substituted nitrogen heterocycles are useful stabilizers for a wide variety of organic materials. They are extremely effective protective agents for organic polymeric materials, both natural and synthetic, which are subject to the deleterious effects of oxygen, heat and ultraviolet or visible light. They are especially useful as stabilizers for α - olefin polymers and copolymers, acetal polymers, polyamides, polyesters and polyurethanes.

DETAILED DESCRIPTION

The compounds of the present invention are alkylhydroxyphenylcarboalkoxy - substituted nitrogen heterocycles. More specifically the compounds contain one or more alkylhydroxyphenyl groups bonded through carboalkoxy linkages to nitrogen atoms of a heterocyclic nucleus, said nitrogen atoms located between two carbonyl or thiocarbonyl groups in the ring. The heterocyclic nucleus for the present compounds will therefore contain one or more imidodicarbonyl $$\left(\begin{array}{c} O\ H\ O \\ \|\ |\ \| \\ -C-N-C- \end{array}\right)$$

groups or imidodithiocarbonyl $$\left(\begin{array}{c} S\ H\ S \\ \|\ |\ \| \\ -C-N-C- \end{array}\right)$$

groups. The compounds of the present invention are represented by the general formula $$\begin{array}{c} X \\ \| \\ \begin{bmatrix} C \\ A \\ C \end{bmatrix} N - [C_nH_{2n}] - O - \overset{O}{\underset{\|}{C}} - [C_mH_{2m}] - \begin{array}{c} R\ R \\ \diagup \!\!\!\diagdown\!\!\!\!\!\!\! \diagdown \\ \diagdown \!\!\!\diagup \end{array} OH \\ \| \\ X \end{array} \quad (I)$$

wherin n is an integer for 1 to 12, m is an integer from 0 to 8, R is hydrogen or a hydrocarbon radical containing from 1 to 12 carbon atoms, X is oxygen or sulfur and A is a bivalent molecular grouping. The bivalent radical A may be a hydrocarbon radical, such as alkylene or phenylene, or may contain one or more heteroatoms or other functional groups, such as >NH, >C=S, $$>C=O$$

or the like. In the latter instance where more than one >NH group is present in the ring it will be possible to prepare compounds containing a plurality of alkylhydroxyphenyl groups. While R is preferably hydrogen or a hydrocarbon radical, it may be any other group capable of being substituted on an aromatic ring, such as halogen or a nitro group. Compounds of Formula I which are especially useful for the present invention are those wherein X is oxygen, n is an integer from 1 to 8, m is an integer from 1 to 4 and the hydroxyl group is in the 4-position on the ring and is hindered, i.e., has positioned on the ring immediately adjacent thereto at least one alkyl group containing from 1 to 12 carbon atoms.

The nitrogen heterocycle serves as the nucleus for attaching alkylhydroxyphenyl groups of the formula $$\begin{array}{c} R\ R \\ \diagup \!\!\!\diagdown\!\!\!\!\!\!\! \diagdown \\ -\diagdown \!\!\!\diagup \end{array} OH$$

wherein R is the same as defined for Formula I. So long as the heterocyclic compound contains one or more nitrogen atoms in the ring with two carbonyl or thiocarbonyl groups immediately adjacent thereto such as

the heterocyclic compound can be suitably substituted for the purposes of the present invention. Heterocyclic compounds useful for the substitution of one or more alkylhydroxyphenyl groups thereon include uric acid, hydantoin, allantoin, parabanic acid, alloxan, uracil, thymine, barbituric acid, phenobarbitone, isocyanuric acid, succinimide and maleimide and derivatives thereof, phthalimide and derivatives thereof, and similar structurally related materials. With certain heterocyclic compounds such as barbituric acid and isocyanuric acid, for example, where the ring contains more than one nitrogen atom having two carbonyl or thiocarbonyl groups immediately adjacent thereto, it is possible for a plurality of alkylhydroxyphenyl groups to be substituted. For example, two alkylhydroxyphenyl groups could be substituted on the barbituric acid nucleus and in the case of isocyanuric acid up to three alkylhydroxyphenyl groups could be substituted in accordance with the present invention. It is not necessary, however, in the case of barbituric acid or isocyanuric acid that all of the nitrogen atoms of the ring be substituted. It will suffice if only one nitrogen atom be substituted in such a manner, the remaining nitrogen atoms of the ring being substituted with hydrogen or some other radical. A wide variety of structural modifications are therefor possible with the compounds of the present invention.

A useful class of compounds for use as stabilizers for organic materials, particularly polymeric materials, are the derivatives of isocyanuric acid. These compounds contain one or more alkylhydroxyphenyl groups bonded to the isocyanuric acid nucleus through a carboalkoxy linkage and have the structural formula

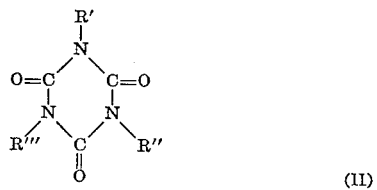

wherein R' is an alkylhydroxyphenylcarboalkoxy group having the formula

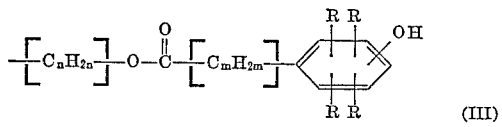

wherein $n$, $m$ and R are the same as defined for Formula I above; and R'' and R''' are the same as R' or are hydrogen, a hydrocarbon radical containing from 1 to 20 carbon atoms such as alkyl, cycloalkyl, aryl, alkaryl or aralkyl, a hydroxyalkyl group containing from 1 to 12 carbon atoms or an alkylcarboalkoxy group containing from 2 to 20 carbon atoms. Especially useful derivatives of isocyanuric acid are those compounds wherein two, and more preferably all, of the nitrogens of the ring are substituted with radicals of the Formula III. Additionally, it has been found that excellent results are obtained when the alkylhydroxyphenylcarboalkoxy group has the formula

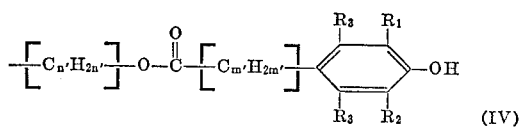

wherein $n'$ is an integer from 1 to 8, $m'$ is an integer from 1 to 4, $R_1$ is an alkyl group containing from 1 to 8 carbon atoms, and $R_2$ and $R_3$ are hydrogen or alkyl groups containing from 1 to 8 carbon atoms. More preferably $R_1$ is a tertiary alkyl group containing from 4 to 8 carbon atoms, $R_2$ is an alkyl group containing from 1 to 8 carbon atoms and $R_3$ is hydrogen. An especially preferred class of compounds of the present invention are those wherein R', R'' and R''' of the Formula II are alkylhydroxyphenyl carboalkoxy groups of Formula IV wherein $n'$ is an integer from 1 to 3, $m'$ is an integer from 1 to 3, $R_1$ and $R_2$ are tertiary alkyl groups containing from 4 to 8 carbon atoms and $R_3$ is hydrogen. Excellent results are obtained with 2,2',2''-tris[3(3,5-di-t-butyl - 4 - hydroxyphenyl) propionyloxy] ethylisocyanurate, alternatively named as 3,5-di-t-butyl-4-hydroxyhydrocinnamic acid triester with 1,3,5-tris(2-hydroxyethyl)-s-triazine-2,4,6(1H, 3H, 5H)-trione, wherein R', R'' and R''' of Formula II are alkylhydroxyphenylcarboalkoxy groups of Formula IV wherein $n'$ is 2, $m'$ is 2, $R_1$ and $R_2$ are t-butyl groups and $R_3$ and $R_4$ are hydrogen.

From the large number of compounds encompassed by the present invention, the following are intended only to be representative:

N-2-[3(3,5-di-t-butyl-4-hydroxyphenyl)propionyloxy] ethylsuccinimide;

N-2-[3(3,5-di-t-butyl-4-hydroxyphenyl)propionyloxy] ethylphthalimide;

2,2',2''-tris[3(3,5-di-t-butyl-4-hydroxyphenyl) propionyloxy]ethyltrithioisocyanurate;

2,2',2''-tris[3(3,5-di-t-butyl-4-hydroxyphenyl) propionyloxy]ethylisocyanurate;

2,2',2''-tris[3(3-methyl-4-hydroxyphenyl)propionyloxy] ethylisocyanurate;

2,2',2''-tris[3(3-t-amyl-4-hydroxyphenyl)propionyloxy] ethylisocyanurate;

2,2',2''-tris[3(3-octyl-4-hydroxyphenyl)propionyloxy] ethylisocyanurate;

2,2',2''-tris[3(3,5-diisopropyl-4-hydroxyphenyl) propionyloxy]ethylisocyanurate;

2,2',2''-tris[3(3,5-dimethyl-4-hydroxyphenyl) propionyloxy]ethylisocyanurate;

2,2',2''-tris[3(3,5-di-t-butyl-4-hydroxyphenyl) propionyloxy]methylisocyanurate;

2,2',2''-tris[3(3,5-di-t-butyl-4-hydroxyphenyl)propionyloxy]-1-methylethylisocyanurate;

6,6',6''-tris[3(3,5-di-t-butyl-4-hydroxyphenyl) propionyloxy]hexylisocyanurate;

2-[3(3,5-di-t-butyl-4-hydroxyphenyl)propionyloxy]-2',2''-bis(hydroxy)ethylisocyanurate;

2,2'-bis[3(3,5-di-t-butyl-4-hydroxyphenyl)propionyloxy]-2''-(hydroxy)ethylisocyanurate;

2,2'-bis(octadecyloxy)-2''-[3(3,5-di-t-butyl-4-hydroxyphenyl)propionyloxy]ethylisocyanurate;

2,2'-bis[3(3,5-di-t-butyl-4-hydroxyphenyl)propionyloxy]-2''-(dodecyloxy)ethylisocyanurate;

2,2',2''-tris(3,5-di-t-butyl-4-hydroxybenzoyloxy) ethylisocyanurate;

2,2',2''-tris[2-methyl-3-(3,5-di-t-butyl-4-hydroxyphenyl) propionyloxy]ethylisocyanurate;

and the like.

The alkylhydroxyphenylcarboalkoxy-substituted nitrogen heterocycles of the present invention are useful stabilizers for a wide variety of organic materials. They are especially useful to prevent oxidative, thermal and photochemical degradation in polymeric materials, both natural and synthetic. The high degree of effectiveness of the present stabilizer compounds is attributed at least partially to their high molecular weight and excellent compatibility with most organic materials. The present compounds are also advantageous in that they are capable of containing two or three alkylhydroxyphenyl substituents per molecule.

Organic materials stabilized in accordance with the present invention incluude both natural and synthetic polymeric materials. The following are representative of the polymers which can be effectively protected by the addition of a stabilizing amount of an alkylhydroxyphenylcarboalkoxy-substituted nitrogen heterocycle thereto: homopolymers of ethylene, propylene, butene-1, isobutylene, pentene-1, hexene-1, 4-methylpentene-1 and the like or copolymers thereof such as ethylenepropylene copolymer, a copolymer of ethylene and butene-1, a copolymer of 4-methyl-1-pentene and hexene-1, and the like; ethylene-propylene terpolymers where the third monomer is a diene such as 1,4-hexadiene, 2-methyl-1,4-hexadiene, a dimethyl-1,4,9 - decatriene, dicyclopentadiene, vinylcyclohexene, vinylnorbornene, ethylidenenorbornene, methylenenorbornene, norbornadiene, methylnorbornadiene, methyltetrahydroindene, and the like; polyacetal resins such as homopolymers obtained from the polymerization of formaldehyde and acetal copolymers derived from trioxane; polyesters obtained by the condensation of saturated or unsaturated anhydrides or dibasic acids, such as maleic, fumaric, itaconic or terephthalic anhydrides or fumaric, adipic, azaleic, sebacic or isophthalic acids, with a glycol such as propylene glycol, ethylene glycol, diethylene glycol, neopentyl glycol or trimethylpentane diol; polyurethanes derived from a glycol such as trimethyl propane glycol, butanediol, or a mixture thereof, or a polyol derived from a polyester, polyether or derivative of polycaprolactone, with a polyisocyanate such as an aromatic or aliphatic diisocyanate or isocyanate-terminated prepolymer; and polyamides such as polycaprolactam or those obtained by the condensation of hexamethylenediamine with adipic or sebacic acid or the like. The compounds of this invention are also useful for the stabilization of natural rubber; halogenated rubbers; polymers derived from conjugated dienes such as polybutadiene, copolymers of butadiene and styrene, acrylonitrile, acrylic acid, alkyl acrylates or methacrylates, methylvinyl ketone, vinyl pyridine and the like, polyisoprene or polychloroprene; vinyl polymers such as polyvinyl chloride, polyvinyl fluoride, polyvinylidene chloride, polyvinyl acetate copolymers of vinyl chloride with vinylidine chloride, butadiene, styrene, vinyl esters, acrylic or methacrylic acid, or other $\alpha,\beta$-olefinically unsaturated acids and esters thereof such as alkyl acrylates and methacrylates, $\alpha,\beta$-olefinicially unsaturated ketones and aldehydes and the like; homopolymers and copolymers of acrylic monomers such as acrylic acid, methacrylic acid, methyl acrylate, methyl methacrylate, ethyl acrylate, 2-ethylhexyl acrylate, acrylamide, methacrylamide, N-methylol acrylamide, acrylonitrile, methacrylonitrile or the like; polycarbonates; epoxy resins such as those obtained by the condensation of epichlorohydrin with bisphenols and copolymers of ethylene oxide or propylene oxide with epichlorohydrin; and like polymeric compositions. In general, any polymeric system subject to degradation as a result of oxidative, thermal or photochemical effects will be stabilized by the addition of a small amount of the present compounds thereto.

In addition to the above-mentioned polymeric organic materials the alkylhydroxyphenylcarboalkoxy-substituted nitrogen heterocycles are useful to stabilize nonpolymeric organic materials. Waxes, synthetic and petroleum-derived lubricating oils and greases, mineral oils, fat, tallow, lard, codliver oil and sperm oil, vegetable oils such as castor, linseed, peanut, palm and cotton seed, fuel oil, diesel oil, gasoline and similar materials are effectively stabilized with the compounds of the present invention.

The compounds of the present invention are especially useful for the stabilization of α-monoolefin homopolymers, copolymers and terpolymers, polyacetal homopolymers and copolymers, polyamides, polyesters and polyurethanes. Both high and low density polyethylene, polypropylene, polyisobutylene and poly-4-methyl-pentene-1 show markedly improved resistance to oxidative, thermal and photochemical degradation when stabilizing amounts of the present compounds are added thereto. Ethylene-propylene copolymers and ethylene-propylene terpolymers, containing less than about 10% by weight of a third monomer containing multiple unsaturation, are effectively stabilized with the alkylhydroxyphenylcarboalkoxy-substituted nitrogen heterocycles. Polymer blends of two or more copolymers or homopolymers derived from α-monoolefins are also stabilized in accordance with the present invention.

The amount of stabilizer employed will vary with the organic material to be stabilized and the particular alkylhydroxyphenylcarboalkoxy-substituted nitrogen heterocycle employed. In general, for effective stabilization of most organic materials an amount of alkylhydroxyphenylcarboalkoxy-substituted nitrogen heterocycle ranging from about 0.001% to about 10% by weight based on the weight of the organic material will be employed. In most applications the amount of stabilizer will vary between about 0.01% and about 5% by weight. When α-monoolefin, homopolymers, copolymers or terpolymers are to be stabilized, about 0.05% to about 2.5% by weight of the alkylhydroxyphenylcarboalkoxy-substituted nitrogen heterocycles will be more useful in some applications than in others, any of the compounds of the present invention employed in an amount as defined above will be an effective stabilizer for organic materials.

The compounds of this invention are readily incorporated into most organic materials and generally require no special processing. Conventional methods of incorporation have been found to be adequate. For example, the alkylhydroxyphenylcarboalkoxy-substituted nitrogen heterocycles can be incorporated into the polymers by mixing on a rubber mill or in a Banbury mixer or they may be added alone, in a suitable solvent, or masterbatched with other compounding ingredients to a solution or dispersion of the polymer. The solubility of the present compounds in a wide variety of organic solvents facilitates their use in solution and also renders them compatible with most oils and lubricants.

The present compounds are compatible with conventional compounding ingredients such as processing oils, plasticizers, lubricants, anti-sticking agents, fillers, reinforcing agents, sulfur and other curing agents, accelerators, anti-foaming agents, rust inhibitors and the like. They are also compatible with other known antioxidants, anti-ozonants, color and heat stabilizers, ultraviolet absorbers and the like, and when employed in combination with many of these a synergistic effect will be obtained.

When the alkylhydroxyphenylcarboalkoxy-substituted nitrogen heterocycles are combined with peroxide decomposing compounds such as dithiocarbamates, zinc dialkylthiophosphates, phosphites such as tris(p-nonylphenyl) phosphite and tridecylphosphite, organic sulfides and similar sulfur-containing compounds, a marked increase in the stability of the resulting polymer composition over that obtained by employing an identical amount of either stabilizer component individually is obtained.

Peroxide decomposing compounds such as the organic sulfides described in U.S. Pat. No. 2,519,755 are advantageously employed in conjunction with the novel compounds of this invention to give highly effective synergistic stabilizer compositions. Especially useful organic sulfides are diesters of β-thiodipropionic acid having the formula

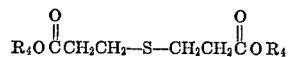

wherein $R_4$ is a hydrocarbon radical containing from about 6 to 20 carbon atoms such as octyl, nonyl, decyl, lauryl, cetyl, stearyl, palmityl, benzyl, cyclohexyl and the like.

Also useful in combination with the alkylhydroxyphenylcarboalkoxy-substituted compounds of the present invention to obtain synergistic activity are thiopropionamides, that is, compounds containing one or more molecular groupings of the formula

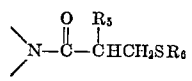

wherein $R_5$ is a hydrogen or a methyl radical and $R_6$ is a hydrocarbon radical containing from 1 to 24 carbon atoms. Such thiopropionamide compounds include bis- and tris-thiopropionamides such as described in copending application Ser. No. 873,650. Illustrative of useful sulfur-containing compounds of the above type which may be used in combination with the alkylhydroxyphenylcarboalkoxy-substituted nitrogen heterocycles include N,N'-methylene-bis[β-(octylthio)propionamide],
N,N'-methylene-bis[β-(octylthio)-α-methylpropionamide],
N,N'-methylene-bis[β-(dodecylthio)propionamide],
N,N'-methylene-bis[β-(hexadecylthio)propionamide],
N,N'-methylene-bis[β-(octadecylthio)-α-methylpropionamide],
hexahydro-1,3,5-tris[β-(octylthio)propionyl]-s-triazine,
hexahydro-1,3,5-tris[β-(octylthio)-α-methylpropionyl]-s-triazine,
hexahydro-1,3,5-tris[β-(dodecylthio)propionyl]-s-triazine,
hexahydro-1,3,5-tris[β-(octadecylthio)propionyl]-s-triazine,
hexahydro-1,3,5-tris[β-(octadecylthio)-α-methylpropionyl]-s-triazine,
hexahydro-1,3,5-tris[β-(phenylthio)propionyl]-s-triazine, and the like.

Additionally, alkylcarboxyalkylthiopropionamides, that is, sulfur-containing compounds containing one or more groups having the structural formula

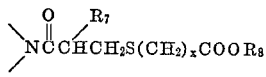

wherein $R_7$ is hydrogen or a methyl group, $x$ is an integer from 1 to 9 and $R_8$ is a hydrocarbon radical containing from 1 to 24 carbon atoms, may be advantageously employed in combination with the alkylhydroxyphenylcarboalkoxy-substituted compounds of the present invention. Specific alkylcarboxyalkylthiopropionamides which may be employed include N,N'-methylene-bis[β-(n-dodecyl-2-carboxyethylthio)propionamide],
N,N'-methylene-bis[β-(n-dodecyl-2-carboxyethylthio)-α-methylpropionamide],
N,N'-methylene-bis[β-(n-dodecylcarboxymethylthio)-α-methylpropionamide],
N,N'-methylene-bis[β-(octadecyl-2-carboxyethylthio)propionamide],
N,N'-methylene-bis[β-(octadecyl-2-carboxyethylthio)-α-methylpropionamide],
hexahydro-1,3,5-tris[β-(n-dodecyl-2-carboxyethylthio)propionyl]-s-triazine,
hexahydro-1,3,5-tris[β-(n-dodecylcarboxymethylthio)-α-methylpropionyl]-s-triazine,
hexahydro-1,3,5-tris[β-(hexadecyl-2-carboxyethylthio)propionyl]-s-triazine,
hexahydro-1,3,5-tris[β-(octadecyl-2-carboxyethylthio)propionyl]-s-triazine,
hexahydro-1,3,5-tris[β-(octadecyl-2-carboxyethylthio)-α-methylpropionyl]-s-triazine, and the like.

When combinations of stabilizers are employed to obtain synergistic activity, the total amount of the stabilizer combination will range between about 0.01% and 5% by weight based on the polymer composition. Excellent results have been obtained when the total stabilizer concentration is between about 0.1% and 2% by weight and the weight ratio of the sulfur-containing compound to the alkylhydroxyphenylcarboalkoxy-substituted nitrogen heterocycle is about 1:1. The weight ratio of the two components can be varied between about 5:1 and 1:5 and still obtain synergistic activity.

To obtain the alkylhydroxyphenylcarboalkoxy-substituted nitrogen heterocycles any number of reaction schemes may be employed. Esterification of a hydroxyalkyl-substituted nitrogen heterocycle with an acid of the formula

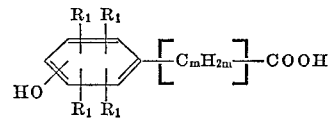

wherein $R_1$ and $m$ are the same as defined above in Formula I, is particularly convenient to prepare the present compounds. The esterification reaction will generally be conducted with an acidic catalyst in an inert solvent. The amounts of reactants employed will be determined by the degree of substitution desired and the particular nitrogen heterocycle to be substituted. For example, if a tris(hydroxyalkyl)isocyanurate is to be completely substituted, three mols of the acid will be employed per mol of the isocyanuric acid derivative. If partial substitution of the nitrogen heterocycle is desired, the amount of the acid reacted therewith will be decreased proportionately in accordance with the desired degree of substitution.

The acid to be reacted may be obtained by any of the conventional methods including hydrolysis of an ester precursor. Similarly, the hydroxyalkyl-substituted nitrogen heterocycle may be obtained by a variety of methods depending on the particular hydroxyalkyl group to be substituted. For example, hydroxymethyl groups may be substituted on isocyanuric acid or other nitrogen heterocycle by reaction with formaldehyde. Three mols of formaldehyde would be reacted with one mol of cyanuric acid at an elevated temperature to obtain tris(hydroxymethyl)isocyanurate. Tris(2-hydroxyethyl)isocyanurate may be obtained by the reaction of ethylene oxide and cyanuric acid in dimethylformamide or dimethylacetamide. If long chain hydroxyalkyl groups are to be substituted they may be prepared by the procedure described in U.S. Pat. No. 3,249,607.

The following examples serve to illustrate the invention more fully. In these examples all parts and percentages are on a weight basis unless indicated otherwise. Parts of stabilizer are based on 100 parts of polymer. Various terms used throughout the examples have been abbreviated for convenience and these are as follows:

t-Bu=tertiary butyl
sec-Bu=secondary butyl
Me=methyl
THPI=2,2',2" - tris[3 - (3,5 - di - t - butyl-4-hydroxyphenyl)propionyloxy]ethylisocyanurate

Example I

THPI was prepared by the esterification of 3-(3,5-di-t-butyl - 4 - hydroxyphenyl)propanoic acid with tris-(2-hydroxyethyl)isocyanurate. The 3-(3,5-di-t-butyl-4-hydroxyphenyl)propanoic acid was obtained by first preparing the corresponding methyl ester and then hydrolyzing the ester to the acid. To obtain the methyl-3-(3,5-di-t-butyl-4-hydroxyphenyl)propanoate, 66.2 grams (0.32 mol) 2,6-di-t-butylphenol was reacted with 3.16 grams sodium methoxide in 250 mls N,N-dimethylformamide which was previously dried by passing over 3 A. molecular sieves. The reactor and its contents were then heated for approximately one hour at a maximum temperature of about 160° C. to take off the methanol. The reaction mixture was allowed to cool to about 35° C. and 25.1 grams (0.29 mol) methylacrylate charged. The reaction was heated for about 6 hours at reflux and then neutralized by the addition of hydrochloric acid (1:1 by volume). The N,N-dimethylformamide was removed by stripping under reduced pressure and about 90% yield of crude methyl-3-(3,5-di-t-butyl - 4 - hydroxyphenyl)propanoate based on the amount of acrylate charged was obtained.

The crude reaction product was vacuum distilled at 180° C. and 0.3 mm. mercury to obtain pure methyl-3-(3,5-di-t-butyl-4-hydroxyphenyl)propanoate melting at 62–63° C.

Methyl - 3-(3,5-di-t-butyl-4-hydroxyphenyl)propanoate obtained from several runs as described above was hydrolyzed to obtain the acid by dissolving about 920 grams methyl - 3-(3,5-di-t-butyl-4-hydroxyphenyl)propanoate in about 10 kilograms of water containing about 460 mls. methanol and 175 grams sodium hydroxide. The reaction mixture was refluxed for about one hour, the pH adjusted to about 8 by the addition of 1:1 hydrochloric acid and 26.2 grams sodium hydrosulfite added. The reaction mixture was refluxed until it was essentially colorless. 1:1 hydrochloric acid was then added to reduce the pH to about 2 and precipitate the product. The resulting 3-(3,5-di-t-butyl-4-hydroxyphenyl)propanoic acid was washed and dried in a vacuum oven at 50° C. A 97% yield of the 3-(3,5-di-t-butyl - 4 - hydroxyphenyl)propanoic acid (M.P. 173–174° C.) was obtained.

Esterification of the 3-(3,5-di-t-butyl-4-hydroxyphenyl) propanoic acid with tris-(2-hydroxyethyl)isocyanurate, obtained by the reaction of cyanuric acid with ethylene oxide in N,N-dimethylformamide as described by R. W. Cummins, J. Amer. Chem. Soc., 28, 85 (1963), gives THPI in good yield. The reaction was conducted in a 12-liter glass reactor equipped with a Dean-Stark water trap by combining 157 grams (0.6 mol) tris-(2-hydroxyethyl)isocyanurate and 552 grams (1.98 mols; 10% molar excess) 3-(3,5-di-t-butyl-4-hydroxyphenyl)propanoic acid in three liters dry xylene. Hydrogen chloride was then bubbled into the reaction mixture until it was saturated and 5.53 grams p-toluene sulfonic acid charged. The reaction mixture was then heated to reflux for about 6 hours during which time about 33 mls. water was removed by azeotropic distillation, allowed to cool and the catalyst residues removed by filtration. The xylene was removed under reduced pressure to obtain a glass-like crude product. This crude product was dissolved in about 2 liters of diethyl ether and washed with several portions of 0.5% aqueous sodium hydroxide until the wash had a pH of 10 or greater and then with water. After drying the ether was stripped under vacuum and about 95% yield THPI obtained as a crude glassy material having a softening point of about 67° C. This material was further purified by dissolving at 65–70° C. in about 5 liters heptane and allowing the solution to cool to room temperature with vigorous agitation.

By recrystallization from isopropanol THPI is obtained as a colorless crystalline material melting at 127° C.–128° C. The product was identified as THPI by infrared spectroscopy and nuclear magnetic resonance spectroscopy. Results of elemental analysis of the product are as follows:

|  | Theory for $C_{60}H_{87}N_3O_{12}$ | Found |
|---|---|---|
| Percent: |  |  |
| Carbon | 69.16 | 69–18 |
| Hydrogen | 8.36 | 8.62 |
| Nitrogen | 4.03 | 3.96 |
| Oxygen | 18.44 | 18.24 |

Employing similar esterification procedures to that described above, other alkylhydroxyphenylcarboalkoxy-substituted isocyanurates were prepared. These compounds are tabulated in Table I and conform to the general formula

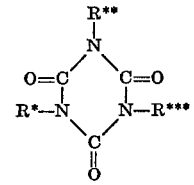

wherein

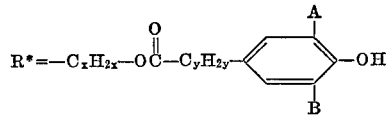

Compounds set forth in Table I were identified by infrared spectroscopy, nuclear magnetic resonance spectroscopy and/or elemental analysis.

TABLE I

| Compound | x | y | A | B | R** | R*** | Formula |
|---|---|---|---|---|---|---|---|
| I(a) | 1 | 2 | t-Bu | t-Bu | R* | R* | $C_{57}H_{81}N_3O_{12}$ |
| I(b) | 3 | 2 | t-Bu | t-Bu | R* | R* | $C_{63}H_{93}N_3O_{12}$ |
| I(c) | 6 | 2 | t-Bu | t-Bu | R* | R* | $C_{72}H_{111}N_3O_1$ |
| I(d) | 2 | 2 | t-Bu | t-Bu | —CH$_2$CH$_2$OH | —CH$_2$CH$_2$OH | $C_{26}H_{38}N_{32}O_8$ |
| I(e) | 2 | 2 | t-Bu | t-Bu | R* | —CH$_2$CH$_2$OH | $C_{43}H_{63}N_3O_{10}$ |
| I(f) | 2 | 2 | t-Bu | t-Bu | —CH$_2$CH$_2$OC(O)(CH$_2$)$_{16}$CH$_3$ | —CH$_2$CH$_2$OC(O)(CH$_2$)$_{16}$CH$_3$ | $C_{62}H_{107}N_3O_{10}$ |
| I(g) | 2 | 2 | t-Bu | t-Bu | R* | —CH$_2$CH$_2$OC(O)(CH$_2$)$_{10}$CH$_3$ | $C_{55}H_{85}N_3O_{11}$ |
| I(h) | 2 | 0 | t-Bu | t-Bu | R* | R* | $C_{54}H_{75}N_3O_{12}$ |
| I(i) | 2 | 3 | t-Bu | t-Bu | R* | R* | $C_{63}H_{93}N_3O_{12}$ |
| I(j) | 2 | 2 | Me | Me | R* | R* | $C_{42}H_{51}N_3O_{12}$ |
| I(k) | 2 | 2 | Me | t-Bu | R* | R* | $C_{51}H_{69}N_3O_{12}$ |
| I(l) | 2 | 2 | t-Bu | H | R* | R* | $C_{48}H_{63}N_3O_{12}$ |
| I(m) | 2 | 2 | sec-Bu | sec-Bu | R* | R* | $C_{60}H_{87}N_3O_{12}$ |

Example II

Employing a procedure similar to that described in Example I, analogous trithioisocyanurates were prepared by reacting three mols 3-(3,5-di-t-butyl - 4 - hydroxyphenyl)propanoic acid with one mol of the hydroxyethyl-substituted thioisocyanurate compound obtained by the reaction of trithiocyanuric acid with a molar excess of ethylene oxide in N,N-dimethylformamide at about 100° C.

Example III

An alkylhydroxyphenylcarboalkoxy-substituted derivative of phthalimide was prepared in accordance with the procedure of Example I by the reaction of 28.6 grams (0.16 mol) of N-(2-hydroxyethyl)phthalimide and 41.7 grams (0.15 mol) 3-(3,5-di-t-butyl-4-hydroxyphenyl)propanoic acid in 250 mls. dry xylene with 0.42 gram p-toluene sulfonic acid. A 65% yield of N-2-[3-(3,5-di-t-butyl-4-hydroxyphenyl)propionyloxy]ethylphthalimide melting at 107–109° C. was obtained. The structure was confirmed by nuclear magnetic resonance spectroscopy and infrared spectroscopic analysis. Elemental analysis indicated 72.22% carbon, 7.41% hydrogen, 3.04% nitrogen and 17.33% oxygen to be present. Calculated for N-2-[3-(3,5-di-t-butyl - 4 - hydroxyphenyl)propionyloxy]ethylphthalimide is 71.80% carbon, 7.37% hydrogen, 3.11% nitrogen and 17.72% oxygen.

Example IV

N-2-[3-(3,5-di-t-butyl - 4 - hydroxyphenyl)propionyloxy]ethylsuccinimide was prepared in a similar manner by reacting 21.45 grams (0.15 mol) N-(2-hydroxyethyl)succinimide and 41.70 grams (0.15 mol) 3-(3,5-di-t-butyl-4-hydroxyphenyl)propanoic acid in 250 mls. xylene saturated with hydrogen chloride and 0.42 gram p-toluene sulfonic acid. The resulting product was confirmed by nuclear magnetic resonance spectroscopy, infrared spectroscopy and elemental analysis, the results of which were as follows:

| | Theory for $C_{23}H_{33}NO_5$ | Found |
|---|---|---|
| Percent: | | |
| Carbon | 68.49 | 68.93 |
| Hydrogen | 8.49 | 8.48 |
| Nitrogen | 3.47 | 3.42 |
| Oxygen | 19.85 | 19.17 |

The crystalline material melted at 93.5° C.

Example V

To demonstrate the utility of the THPI as a stabilizer for α-olefin polymers, 100 parts high-density polyethylene was stabilized with 0.05 part THPI and compared against an unstabilized control by measuring the oxidation by differential thermal analysis.

The oxidative stability of the various polymers was measured employing a differential thermal analytical technique such as described by A. Rudin et al., Ind. & Eng. Chem., 53, No. 2, 137–140 (1961). This is a quick and convenient method for determining the oxidation resistance of polymers. Stabilizers were incorporated into the polymer samples to be tested by preparing a standard solution of the stabilizer in benzene, adding the proper volume of the standard solution to a known weight of the polymer so as to give the desired stabilizer level, and evaporating the benzene by air drying. Two milligram samples are run in air and in nitrogen with the instrument programmed to give a temperature rise of 10° C./minute. From the resulting thermogram the oxidation exotherm can be observed. The higher the temperature at which the oxidation exotherm appears the greater the oxidative resistance of the sample.

The unstabilized polyethylene sample had its oxidation exotherm at 200° C. whereas the oxidation endotherm for the sample stabilized with 0.05 part THPI appeared at 223° C.

To further demonstrate the effectiveness of the THPI, it was compared with a well-known commercially available stabilizer material, Irganox 1010. Irganox 1010 is sold by Geigy Chemical Corporation and is tetra[methylene-3-(3,5 - di-t-butyl-4-hydroxyphenyl)propionate]methane. High-density polyethylene stabilized with 0.05 part Irganox 1010 showed an oxidation exotherm at 220° C.

Example VI

Polypropylene stabilized with 0.25 part THPI and tested in accordance with the procedure described above in Example V had an oxidation exotherm of 227° C. Unstabilized polypropylene had its oxidation exotherm of 176° C.

Polypropylene samples stabilized with THPI were also subjected to long-term oven aging to demonstrate the effectiveness of the stabilizer compounds of the present invention by themselves and in combination with sulfur-containing synergist compounds such as distearylthiodipropionate. To prepare the test samples polypropylene was dry blended with the stabilizers and then fluxed in an extruder at 450° F. The extrudate was pelletized and hot pressed at 420° F. into 10 mil thick specimens which were aged in an air-circulating oven at 150° C. The samples were deemed to have failed at the first sign of crazing. Test results for the various samples are tabulated below:

| | Sample | | | | | |
|---|---|---|---|---|---|---|
| | a | b | c | d | e | f |
| Polypropylene | 100 | 100 | 100 | 100 | 100 | 100 |
| THPI | | 0.10 | 0.25 | 0.10 | 0.25 | |
| Distearylthiodipropionate | | | | 0.25 | 0.25 | 0.25 |
| Days to failure | <1 | 20 | 45 | 45 | 59 | <1 |

Example VII

Ethylene-propylene terpolymer (53% ethylene, 43% propylene and about 4% ethylidene norbornene) was stabilized with 0.3 part THPI and two other commercially available stabilizer compositions at the 0.3 part level. Test samples were prepared by forming a 20% cement by dissolving the terpolymer and stabilizer in xylene and then casting a film of the desired thickness on an infrared salt (KBr) plate by evaporation of the solvent. The specimens were aged in an air-circulating oven at 125° C. and removed at regular intervals to measure the development of the carbonyl content by infrared analysis. The carbonyl content is plotted versus aging time and failure of the sample is marked by a sharp break in the curve. Test results were as follows:

| Stabilizer: | Hours to failure |
|---|---|
| None | <1 |
| THPI | 22.8 |
| n-Octadecyl-β-(3,5 - di-t-butyl-4-hydroxyphenyl)propionate | 4.7 |
| Tetra[methylene-3-(3,5 - di-t-butyl-4-hydroxyphenyl)propionate]methane | 16.8 |

The superior oxidative resistance of the samples stabilized with THPI is evident from the above data.

Example VIII

One part THPI was incorporated in a synthetic natural rubber composition (cis-polyisoprene) and the stabilized rubber tested in a Brabender Plasticorder to measure the stability of the polymer. The stabilized polymer was placed in the heating chamber, heated at 135° C. and the torque recorded. The time required for the torque to drop 1000 units from the maximum (2500 units) was 7.5 minutes for the stabilized sample. An unstabilized control ran for only 3 minutes.

Example IX

A polymer blend of polyvinyl chloride, acrylonitrile-butadiene-styrene terpolymer and butadiene-nitrile polymer was stabilized by the addition of 4 parts THPI and the polymer tested in accordance with ASTM D–1925–63T for the development of the yellowness during milling at 350° F. Initially both the unstabilized polymer blend and the stabilized polymer blend has a yellowness factor of 41. After 90 minutes milling the unstabilized blend deteriorated to an 82 yellowness factor while the stabilized composition only had a yellowness factor of 67.

Example X

Acrylonitrile-butadiene-styrene latex was coagulated and 1.75 parts THPI added to the dry resin in a blender. The resulting stabilized composition was tested employing the differential thermal analytical technique previously described. A 50% oxygen atmosphere was used. The stabilized acrylonitrile - butadiene - styrene composition showed no oxidation exotherm until about 300° C. The unstabilized composition had an oxidation exotherm at 180° C.

Example XI

THPI was evaluated as an oxidation inhibitor in the ASTM D–943 turbine-oil oxidation test and compared against an unstabilized sample. The turbine-oil was Texaco Regal Oil A, a 150 HVI neutral turbine oil. 2.5% THPI plus 0.05% of a rust inhibitor, tetrapropenylsuccinic anhydride, were added to the oil. The stabilized turbine oil had a life of 525 hours whereas the unstabilized oil deteriorated within 24 hours.

Example XII

A polyether-based urethane was stabilized with 0.5% THPI by adding the THPI to the polyol blend prior to heating to the reaction temperature. The stabilized polyurethane had only a 60% decrease in tensile strength after one week oven aging at 121° C. whereas an identical unstabilized polyurethane showed a 77% decrease in tensile strength after oven aging at 121° C. for one week.

Example XIII

A plasticized high temperature polyvinyl chloride resin suitable for wire and cable applications was stabilized by the addition of THPI and Bisphenol A. The resin and stabilizer were mixed in a laboratory Banbury at a temperature of 345° to 360° F. and then milled at 310° F. for about 5 minutes. Specimens were die-cut from 0.035 and 0.075 sheets and pressed for 5 minutes at 345° F. between ferro-type plates with approximately 1400 p.s.i. being applied on the platens. The samples were oven-aged at 158° C. for 7 days and the physical properties determined. Percent retention of elongation for the samples after aging was as follows:

|  | 0.035″ | 0.075″ |
| --- | --- | --- |
| 0.3 part Bisphenol A stabilized PVC: | | |
| Original elongation (percent) | 238 | 258 |
| Elongation after aging (percent) | 188 | 192 |
| Percent retention of elongation | 79.0 | 74.4 |
| 0.3 part THPI stabilized PVC: | | |
| Original elongation (percent) | 246 | 262 |
| Elongation after aging (percent) | 223 | 228 |
| Percent of elongation | 90.7 | 87.1 |

Example XIV

Two acrylic ester latices were stabilized by the addition of 0.5 part THPI. Acrylic latex A contained about 95 parts ethyl acrylate and 3 parts acrylonitrile with acrylic acid and N-methylol acrylamide interpolymerized. Latex B contained a mixture of ethyl acrylate and n-butyl acrylate (85 parts) polymerized with 10 parts acrylonitrile and acrylamide. THPI was added to the latices as a 20% emulsion. The resulting stabilized latices were then diluted to 15% total solids and used to saturate 10 mil bleached Kraft flat paper (Patterson Code 515) by immersing the paper in the latex for 20 seconds, drip-drying and curing for 10 minutes. The papers were heat-aged at 300° F. in an air-circulating oven and the percent reflectance, which is a measure of the discoloration of the paper, measured at hour intervals. Initial reflectance readings before aging for both the stabilized and unstabilized saturated papers ranged between 77% and 78.5%. After 25 hours heat-aging the reflectance for the unstabilized paper saturated with Latex A was 27.5% as compared with 44.5% for the stabilized paper. For the papers saturated with Latex B, the reflectance for the paper coated with the unstabilized latex dropped to 40.5% after 25 hours aging whereas the reflectance for the paper saturated with the stabilized latex was 59.9%.

Example XV

A styrene-butadiene latex was stabilized by the addition of THPI to the latex (1.25 parts based on dry polymer). After coagulation, the crumbs were milled and 2″ x 6″ samples cut from the sheet for oven aging at 105° C. Mooney viscosity data (ML 4–212° F.) indicated that marked improvement of the stability of the SBR samples stabilized with the THPI over that of the unstabilized SBR. Similarly, marked superiority of the stability of THPI stabilized SBR was observed over SBR stabilized with 1.25 parts Antioxidant 2246, 2,2'-methylenebis-4-methyl-6-t-butylphenol sold by American Cyanamid Company. Similar improved stability was observed for butadiene-acrylonitrile copolymer stabilized with THPI at a 2.5 parts level.

Example XVI 100 parts of polyvinyl chloride (Geon 101EP having a density of 1.38) plasticized with about 50 parts dioctyl phthalate and containing 3 parts stearic acid was oven aged at 325° F. The color tone of the specimens was observed at 10-minute intervals. A marked improvement in the resistance to discoloration was observed for the samples stabilized with the THPI as compared with unstabilized PVC samples.

Example XVII

A natural rubber white stock was prepared in accordance with the following recipe:

| Ingredient: | Parts |
| --- | --- |
| Natural rubber | 100 |
| Stearic acid | 2 |
| Zinc oxide | 5 |
| Titanium dioxide | 50 |
| Sulfur | 2.75 |
| Benzothiazyl disulfide | 1 |
| Tetramethylthiuram disulfide | 0.1 |
| THPI | 1 |

Samples of the above composition were press cured at 290° F. for 15 minutes and aged in oxygen bombs maintained at 80° C. for seven days. After four days aging the sample stabiilzed with THPI still retained 50% of its original tensile strength whereas the unstabilized sample only retained 10%. After seven days the unstabilized stock had degraded to a sticky mass whereas the stabilized sample still showed a tensile strength of 1240 p.s.i. with 460% elongation.

Example XVIII

A copolymer of ethylene oxide and epichlorohydrin was compounded in a conventional recipe with zinc stearate, red lead and carbon black and stabilized with 1 part THPI. The cured (30 minutes at 347° F.) composition was then air aged in a test tube for 168 hours at 150° C. The stabilized composition showed a tensile loss of only 79% and a hardness loss of only 21 points after aging. The unstabilized copolymer composition failed completely under these same test conditions.

Example XIX

Other compositions stabilized with varying amounts of THPI are as follows:

| Material: | Parts of THPI |
| --- | --- |
| Polystyrene | 0.5 |
| Neoprene sponge | 1.0 |
| Nylon 6 | 0.5 |
| Cyclohexene | 0.001 |
| Mineral oil | 0.1 |
| Polyoxymethylene | 0.5 |
| Polyethylene terephthalate resin | 0.5 |

All of these compostions showed improved oxidative stability over the unstabilized controls.

Example XX

Unstabilized acetal copolymer resin obtained by polymerizing formaldehyde and ethylene oxide was tested for oxidative stability employing the differential thermal technique previously described. Three levels of THPI were employed. Since the acetal copolymer deteriorates in two stages, first oxidizing and then depolymerizing, both were considered. Results were as follows:

| Parts stabilizer | Oxidation exotherm (° C.) | Depolymerization endotherm (° C.) |
|---|---|---|
| None | 200 | 215 |
| 0.1 | Absent | 220 |
| 0.25 | Absent | 225 |
| 0.5 | Absent | 225 |

Example XXI

A series of stabilized polypropylene compositions were prepared and tested using the differential thermal analytical oxidation test method. All stabilizers were employed at a 0.25 part level. The various stabilizer compounds are identified by reference to the particular example in which they were prepared. An unstabilized control and sample stabilized with a widely known commercial stabilizer composition were also included in the test. Test results are tabulated below.

| Compound: | Oxidation exotherm (° C.) |
|---|---|
| Control—none | 176 |
| I(a) | 216 |
| I(b) | 223 |
| I(c) | 190 |
| I(d) | 217 |
| I(e) | 214 |
| I(f) | 190 |
| I(g) | 237 |
| I(h) | 197 |
| I(i) | 215 |
| I(j) | 230 |
| I(k) | 233 |
| I(l) | 215 |
| I(m) | 200 |
| II | 214 |
| III | 212 |
| IV | 212 |
| CAO–1 [1] | 205 |

[1] CAO-1 is 4-methyl-2,6-di-t-butyl-phenol sold by Hooker Chemical Corporation.

Example XXII

Polyacetal resin as described in Example XX was stabilized with 0.5 part N-2-[3-(3,5-di-t-butyl-4-hydroxyphenyl)propionyloxy]ethylphthalimide and 0.5 part N-2-[3 - (3,5-di-t-butyl-4-hydroxyphenyl)propionyloxy]ethylsuccinimide as prepared in Examples III and IV. Oxidation resistance of the stabilized samples was markedly improved over that of the unstabilized control. Oxidation exotherms for the stabilized samples were absent in both cases while endothermic depolymerization did not occur until 225° C. and 235° C., respectively.

It is evident from the above examples that the THPI and other alkylhydroxyphenylcarboalkoxy - substituted nitrogen heterocycles of the present invention are effective stabilizer compounds for a wide variety of organic materials. By incorporating small amounts of the present stabilizer into polymeric materials marked improvements in the oxidative stability of the polymers has been obtained.

We claim:

1. A stabilized composition of matter comprising an organic material subject to oxidative, thermal or photochemical degradation and about 0.001% to about 10% by weight based on the organic material of an alkylhydroxyphenylcarboalkoxy-substituted nitrogen heterocycle comprising a heterocyclic compound of the formula

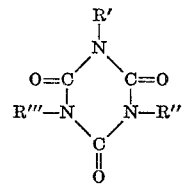

wherein R' is an alkylhydroxyphenylcarboalkoxy group having the formula

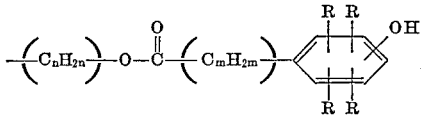

wherein $n$ is an integer from 1 to 12, $m$ is an integer from 0 to 8 and R is selected from the group consisting of hydrogen, alkyl, cycloalkyl, phenyl, alkylphenyl and phenylalkyl radicals containing from one to 12 carbon atoms; and R'' and R''' are the same as R' or are selected from the group consisting of hydrogen, alkyl, cycloalkyl, phenyl, alkylphenyl, phenylalkyl radicals containing 1 to 20 carbon atoms, a hydroxyalkyl group containing from 1 to 12 carbon atoms and an alkylcarboalkoxy group containing 2 to 20 carbon atoms.

2. A stabilized composition of matter of claim 1 wherein the organic material is a polymeric material selected from the group consisting of an α-monoolefin homopolymer, an α-monoolefin copolymer, an α-monoolefin terpolymer, a polyacetal homopolymer, a polyacetal copolymer, a polyamide, a polyester and a polyurethane.

3. The stabilized composition of matter of claim 2 wherein the alkylhydroxyphenylcarboalkoxy-substituted nitrogen heterocycle is present in an amount between about 0.01% and 5% by weight.

4. The stabilized composition of matter of claim 2 wherein the polymeric material is an α-monoolefin homopolymer, copolymer or terpolymer; R' of the alkylhydroxyphenylcarboalkoxy-substituted nitrogen heterocycles has the formula

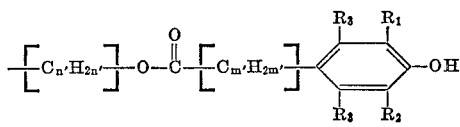

wherein $n'$ and $m'$ are integers from 1 to 3, $R_1$ and $R_2$ are tertiary alkyl groups containing from 4 to 8 carbon atoms and $R_3$ is hydrogen; and the alkylhydroxyphenylcarboalkoxy-substituted nitrogen heterocycle is present in an amount between about 0.05% and 2.5% by weight.

5. The stabilized composition of matter of claim 4 wherein the alkylhydroxyphenylcarboalkoxy-substituted nitrogen heterocycle is 2,2',2''-tris[3(3,5-di-t-butyl-4-hydroxyphenyl)propionyloxy]ethylisocyanurate.

6. The stabilized composition of matter of claim 4 wherein there is additionally present a peroxide decomposing compound, the total amount of stabilizer is between about 0.01% and 5% by weight based on the polymer composition and the weight ratio of the peroxide decomposing compound to the alkylhydroxyphenylcarboalkoxy-substituted nitrogen heterocycle is between about 5:1 and 1:5.

7. The stabilized composition of matter of claim 6 wherein the peroxide decomposing compound is a diester of β-thiodipropionic acid having the formula

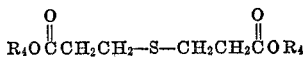

wherein $R_4$ is a hydrocarbon radical containing from 6 to 20 carbon atoms and the weight ratio of the peroxide decomposing compound to the alkylhydroxyphenylcarboalkoxy-substituted nitrogen heterocycle is about 1:1.

8. The stabilized composition of matter of claim 7 wherein in the alkylhydroxyphenylcarboalkoxy-substituted nitrogen heterocycle R'=R''=R'''.

9. The stabilized composition of matter of claim 8 wherein the polymeric material is polyethylene or polypropylene and the total amount of stabilizer is between about 0.1% and 2% by weight.

10. The stabilized composition of matter of claim 9 wherein the alkylhydroxyphenylcarboalkoxy-substituted nitrogen heterocycle is 2,2',2''-tris[3(3,5-di-t-butyl-4-hydroxyphenyl)propionyloxy]ethylisocyanurate and the peroxide decomposing compound is dilaurylthiodipropionate or distearylthiodipropionate.

11. A stabilized composition of matter comprising an organic material subject to oxidative, thermal or photochemical degradation and about 0.001% to about 10% by weight based upon the organic material of a hydroxyphenylcarboalkoxy-substituted nitrogen heterocycle, the said heterocycle compound containing one or more nitrogen atoms with two carbonyl or thiocarbonyl groups immediately adjacent thereto in the ring selected from the group consisting of uric acid, hydantoin, allantoin, parabanic acid, alloxan, uracil, thymine, barbituric acid, phenobarbitone, succinimide, maleimide, and phthalimide; and substituted at one or more nitrogen atoms with an alkylhydroxyphenyl group of the formula

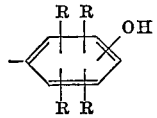

wherein R is hydrogen or a hydrocarbon radical containing from 1 to 12 carbon atoms, said alkylhydroxyphenyl group bonded to the nitrogen atom of the heterocycle nucleus with a carboalkoxy group containing 2 to 20 carbon atoms.

12. A composition of claim 11 wherein in the alkylhydroxyphenylcarboalkoxy-substituted nitrogen heterocycle the said carboalkoxy group has the formula

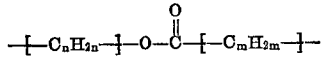

wherein $n$ is an integer from 1 to 12, $m$ is an integer from 0 to 8, R is hydrogen or an alkyl, cycloalkyl, aryl, alkaryl, or aralkyl radical containing from 1 to 12 carbon atoms.

13. A composition of claim 12 wherein the alkylhydroxyphenylcarboalkoxy-substituted nitrogen heterocycle contains an alkylhydroxyphenylcarboalkoxy group having the formula

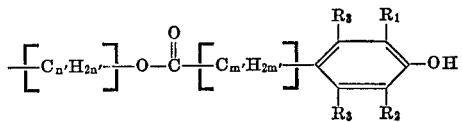

wherein $n'$ is an integer from 1 to 8, $m'$ is an integer from 1 to 4, $R_1$ is an alkyl group containing from 1 to 8 carbon atoms and $R_2$ and $R_3$ are hydrogen or an alkyl group containing from 1 to 8 carbon atoms.

14. A composition of claim 13 wherein in the alkylhydroxyphenylcarboalkoxy-substituted nitrogen heterocycle $R_1$ is a tertiary alkyl group containing from 4 to 8 carbon atoms, $R_2$ is an alkyl group containing from 1 to 8 carbon atoms and $R_3$ is hydrogen.

15. A composition of claim 14 wherein in the alkylhydroxyphenylcarboalkoxy-substituted nitrogen heterocycle $R_2$ is a tertiary alkyl group containing from 4 to 8 carbon atoms and $n'$ and $m'$ are integers from 1 to 3.

16. A composition of claim 13 wherein the alkylhydroxyphenylcarboalkoxy-substituted nitrogen heterocycle is N-2-[3-(3,5-di-t-butyl-4-hydroxyphenyl)propionyloxy]ethylphthalimide.

17. A composition of claim 13 wherein the alkylhydroxyphenylcarboalkoxy-substituted nitrogen heterocycle is N-2-[3-(3,5-di-t-butyl-4-hydroxyphenyl)propionyloxy]ethylsuccinimide.

References Cited

UNITED STATES PATENTS

| | | | |
|---|---|---|---|
| 3,644,277 | 2/1972 | Gilles | 260—45.8 |
| 3,598,815 | 8/1971 | Gilles | 260—45.8 |
| 3,637,582 | 1/1972 | Gilles | 260—45.8 |
| 3,435,065 | 3/1969 | Dexter et al. | 260—45.8 |
| 3,644,482 | 2/1972 | Dexter et al. | 260—45.85 |
| 3,004,035 | 10/1961 | Csendes | 260—45.8 |
| 3,629,192 | 12/1971 | Heller et al. | 260—45.8 |
| 3,436,362 | 4/1969 | Hayer et al. | 260—45.8 |
| 3,394,102 | 7/1968 | Wakasa et al. | 260—45.8 |
| 3,360,520 | 12/1967 | Luckenbaugh et al. | 260—45.8 |
| 2,574,987 | 3/1950 | Shelley | 260—45.8 |

DONALD E. CZAJA, Primary Examiner

E. C. RZUCIDLO, Assistant Examiner

U.S. Cl. X.R.

252—405; 260—45.8 NT, 45.85 B, 45.9

UNITED STATES PATENT OFFICE
CERTIFICATE OF CORRECTION

Patent No. 3,763,093                    Dated October 2, 1973

Inventor(s) George Kletecka and Peter D. Smith

It is certified that error appears in the above-identified patent and that said Letters Patent are hereby corrected as shown below:

In Table I, Columns 9 and 10, the formula for Compound I(c) reading "$C_{72}H_{111}N_3O_1$" should read ---$C_{72}H_{111}N_3O_{12}$---;

the formula for Compound I(d) reading "$C_{26}H_{38}N_{32}O_8$" should read ---$C_{26}H_{39}N_3O_8$---; and the R** for Compound I(f) reading "$-CH_2CH_2OC(CH_2)_{16}CH_3$" with O double-bonded to C, should read ---$CH_2CH_2O\overset{O}{\overset{\|}{C}}(CH_2)_{16}CH_3$---.

Signed and sealed this 21st day of May 1974.

(SEAL)
Attest:

EDWARD M. FLETCHER, JR.
Attesting Officer

C. MARSHALL DANN
Commissioner of Patents